(12) United States Patent
Rodrigues-Morgado et al.

(10) Patent No.: US 9,150,048 B2
(45) Date of Patent: Oct. 6, 2015

(54) TOOL FOR HOLDING A WHEEL BEARING OR A WHEEL BEARING SEAL OF A VEHICLE WHEEL, METHOD OF INSTALLING OR MAINTAINING A SET OF VEHICLE WHEELS AND SET OF WHEELS USING SUCH A TOOL

(75) Inventors: Cedric Rodrigues-Morgado, Toulouse (FR); Pascal Martinez, Saint Lys (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 307 days.

(21) Appl. No.: 13/811,321

(22) PCT Filed: Jul. 20, 2011

(86) PCT No.: PCT/FR2011/000433
§ 371 (c)(1),
(2), (4) Date: Jan. 21, 2013

(87) PCT Pub. No.: WO2012/017142
PCT Pub. Date: Feb. 9, 2012

(65) Prior Publication Data
US 2013/0125370 A1 May 23, 2013

(30) Foreign Application Priority Data

Jul. 20, 2010 (FR) ...................................... 10 55905

(51) Int. Cl.
*B60B 29/00* (2006.01)
*B25B 27/06* (2006.01)
*B64C 25/36* (2006.01)
*B64F 5/00* (2006.01)
*B25B 27/00* (2006.01)
*B60B 27/00* (2006.01)

(52) U.S. Cl.
CPC ............. *B60B 29/00* (2013.01); *B25B 27/0028* (2013.01); *B25B 27/06* (2013.01); *B60B 27/00* (2013.01); *B60B 29/008* (2013.01); *B64C 25/36* (2013.01); *B64F 5/0009* (2013.01); *Y10T 29/49826* (2015.01); *Y10T 29/5397* (2015.01)

(58) Field of Classification Search
CPC .... B25B 27/0028; B25B 27/06; B64C 25/36; B60B 29/00; B60B 27/00; B60B 29/008; B64F 5/0009; Y10T 29/5397; Y10T 29/49826
See application file for complete search history.

(56) References Cited

U.S. PATENT DOCUMENTS

| 3,571,887 A | 3/1971 | McIntire |
| 4,562,631 A | 1/1986 | Welch |

FOREIGN PATENT DOCUMENTS

GB 584276 1/1947

*Primary Examiner* — John C Hong
(74) *Attorney, Agent, or Firm* — Greer Burns & Crain, Ltd.

(57) ABSTRACT

A tool for holding the wheel bearing or the wheel bearing seal of a vehicle wheel. This tool is useful in the fields of aircraft manufacture and aircraft maintenance. The aircraft wheel is of the kind comprising a rim that has a flange on the hub side and a wheel bearing, mounted on a stub axle. The holding tool comprises a plate bearing a collar that presses against the wheel bearing. An arrangement to lock the tooling onto the rim of the wheel flange brings the pressing collar into locked contact with the wheel bearing.

19 Claims, 4 Drawing Sheets

Fig. 2
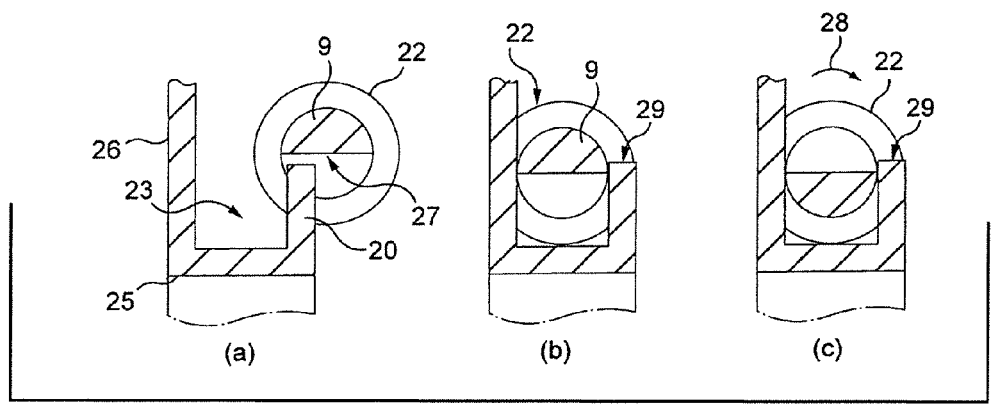
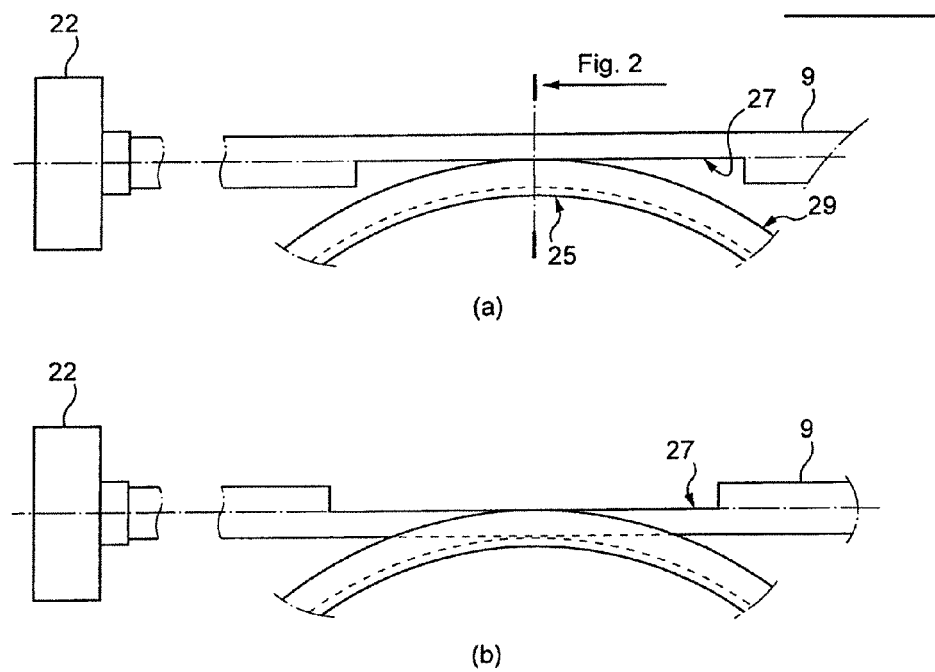
Fig. 3

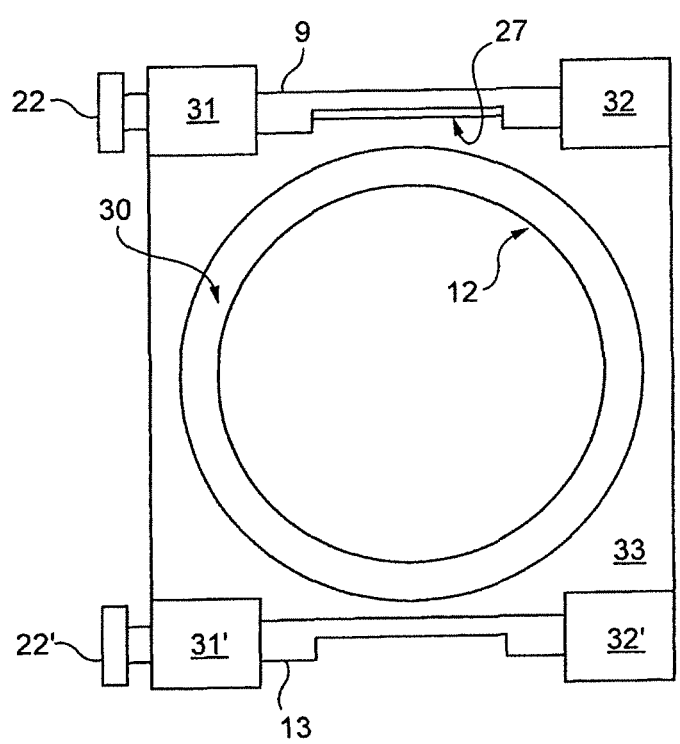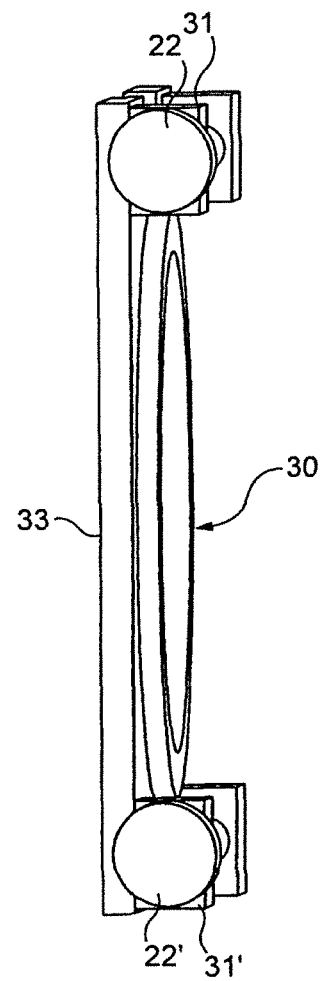
Fig. 4(a)
Fig. 4(b)

TOOL FOR HOLDING A WHEEL BEARING OR A WHEEL BEARING SEAL OF A VEHICLE WHEEL, METHOD OF INSTALLING OR MAINTAINING A SET OF VEHICLE WHEELS AND SET OF WHEELS USING SUCH A TOOL

RELATED APPLICATIONS

The present application claims priority to French Patent Application Ser. No. 1055905 filed on Jul. 20, 2010, the entirety of which is incorporated herein by reference

BACKGROUND OF THE INVENTION

The present invention relates to a tool for holding a wheel bearing or a wheel bearing seal of a vehicle wheel. It also relates to a method of installing/mounting or maintaining a vehicle wheel and a set of vehicle wheels using such a tool. It is applicable in the fields of aircraft manufacture as well as aircraft maintenance.

An aircraft comprises several undercarriages, each constituting a set of one or more wheels. During the manufacture of the aircraft, each wheel must be placed on its stub axle in order to allow it to be fixed subsequently. The same type of operation must be carried out during the maintenance of the aircraft.

When the aircraft is very large, the weights moved during mounting are high, while the operations of orienting and positioning the wheel hub on the stub axle are extremely precise.

In particular, it has been observed that, during mounting, a dynamic effect of the stub axle on the wheel bearing that equips the wheel leads to the ejection of the wheel bearing or, more specifically, the wheel bearing seal that protects it from the outside. When such a situation occurs in the aeronautical field, a non-conformity is raised in the manufacturing process and there is then a possibility of the wheel mounting being failed by the aircraft safety authorities.

Such a situation involves significant costs and the need to re-start the mounting operation with a new wheel. Said requirement also extends the unavailability time during maintenance or the mounting time during manufacture of the aircraft.

SUMMARY OF THE INVENTION

The present invention overcomes said drawback of the state of the art. The invention relates to a tool for holding a wheel bearing or a wheel bearing seal of a vehicle wheel of the type comprising a rim having a flange and a wheel bearing with or without a wheel bearing seal, the tool being intended for mounting on the wheel rim, characterized in that the holding tool comprises a plate carrying at least one pressing element and at least one means of locking the tool on the rim so as to bring said at least one pressing element into contact with the wheel bearing or the wheel bearing seal.

An advantage of said arrangement is to immobilize the outer bearing of the wheel during its mounting or removal respectively, for example on the undercarriage, whether a central or wing undercarriage. The same advantage is given to a vehicle wheel such as that of a lorry or bus.

According to other advantageous features, singly or in combination:

if the wheel comprises a wheel bearing seal, said at least one element for pressing the plate of the tool, such as a pressing collar, bears on the wheel bearing seal arranged on the outside of the wheel bearing; an advantage of said arrangement is that it immobilizes the wheel bearing seal, preferably placed on the outer bearing of the wheel during the mounting or removal respectively of the wheel on the undercarriage: the invention is applicable in an identical manner to an arrangement without a seal bearing directly on the wheel bearing, or on the back-up seal when installed, which is generally the normal situation;

the plate has an axial central opening, said at least one pressing element being arranged on the periphery of the axial central opening on one of the two opposite faces of the plate that is intended to be placed facing the wheel rim; said arrangement of the tool is particularly simple and effective and the central opening allows the insertion of equipment and leaves free access to the stub axle on which the wheel is mounted; one or more pressing elements are arranged on the periphery of the opening over the whole circumference or on only a portion of the latter, being for example distributed over the circumference;

said at least one pressing element extends axially away from the face of the plate on which it is arranged; thus, the plate is positioned against the rim flange while the axial extension of said at least one pressing element allows the latter to come into contact with the wheel bearing or the wheel bearing seal; it will be noted that the axial extension has an axial dimension that is at least substantially equal to the thickness or axial extension of the rim flange in order to allow the wheel bearing or the wheel bearing seal to be kept in position while the plate is in contact with the rim flange;

said at least one pressing element is a pressing collar; said arrangement has a particularly simple design; according to a variant, the collar is replaced by a series of collar portions or arcs arranged around a circumference, on the periphery of the central opening of the plate;

the pressing collar extends axially with respect to the plate so as to form a pressing flange; according to a variant, a series of collar portions or arcs arranged around a circumference, on the periphery of the central opening of the plate, extend axially with respect to the plate so as to form several pressing flanges;

said at least one locking means comprises an engagement element that is mobile between an idle position and an active position, displacing the engagement element from the idle position to the active position allowing said engagement element to be engaged on the rim flange and thus lock the tool on the rim;

said at least one locking means comprises at least one mobile rod that is capable of cooperating with the rim flange to lock the tool on the rim; the rod is for example arranged in a plane substantially parallel to that of the rim flange when the tool is in the installation position on the rim and said plane corresponds to that of the rim flange when the rod cooperates with the flange and locks the tool in position;

said at least one locking means comprises at least one cylindrical rod, the central portion of which has a notch and which can turn about its axis so as to pass the rim flange during the mounting of the tool, then go back down inside the flange to apply said at least one pressing element onto the wheel bearing and/or the wheel bearing seal in a locked condition; an advantage of said arrangement is to make use of a profile of the rim, or similarly another part of the wheel, in order lock the tool thereon;

the cylindrical rod is carried at each end by two blocks firmly fixed to the tool on the face of the plate opposite the one on which said at least one pressing element such as a pressing collar is arranged; an advantage of said arrangement is to fix the correctly profiled locking rod firmly in rotation:

one of the blocks has a ball plunger pressing on an impression in the cylindrical rod pressing towards the inside of the rim when the tool is installed on the wheel, more particularly on the wheel rim; an advantage of said arrangement is to render the locking relatively stable during the mounting or removal period of the wheel respectively, for example on the undercarriage; the same advantage is provided for a set of vehicle wheels such as a lorry or bus axle;

the central portion of the rod is inserted into a housing made from a material allowing the rim flange to be protected;

one of the ends of the rod has a knob that when actuated allows the rod to be rotated by half a turn on the blocks during the installation of the tool or when it is removed; an advantage of said arrangement is to allow the wheel to be handled ergonomically by an operative during its mounting or removal respectively, for example on the undercarriage;

the tool comprises two diametrically opposed locking means, for example on the plate and in particular with respect to the wheel rim; an advantage of said arrangement is to balance the forces on the tool mounted on the rim.

A further subject of the invention is an assembly comprising a tool such as briefly mentioned above and a vehicle wheel comprising a rim having a flange and a wheel bearing with or without wheel bearing seal.

The invention also relates to a method of installing or maintaining a vehicle wheel, such as a wheel of an aircraft undercarriage, characterized in that it comprises:

a step of installing a tool for holding a wheel bearing or a wheel bearing seal of a vehicle wheel, such as briefly mentioned above, on a rim flange of a wheel to be mounted on or removed from the vehicle;

a step of locking at least one locking means of said holding tool onto the wheel rim; and a step of mounting the wheel on a stub axle, respectively removing the wheel from a stub axle.

Among the advantages of the method of the invention, the ergonomic nature of the operations of installing/mounting and/or maintaining aircraft undercarriages, the safety of the tool fastening and the protection afforded to the back-up seal and its wheel bearing should be noted.

The invention also relates to a set of vehicle wheels such as an aircraft undercarriage using a tool for holding a wheel bearing or a wheel bearing seal of an aircraft wheel according to the invention.

BRIEF DESCRIPTION OF THE DRAWINGS

Other features and advantages of the present invention will be better understood in the light of the following description and the attached Figures of which:

FIG. 2 shows three conditions (a), (b) and (c) of a locking means capable of cooperating with the wheel rim flange;

FIG. 3 shows two conditions (a) and (b) of the locking means when it is installed on the rim flange;

FIGS. 4a and 4b are respectively a front view and a side view of the tool ready to be mounted on a wheel before mounting;

DETAILED DESCRIPTION OF THE PREFERRED EMBODIMENTS

Figure 1:
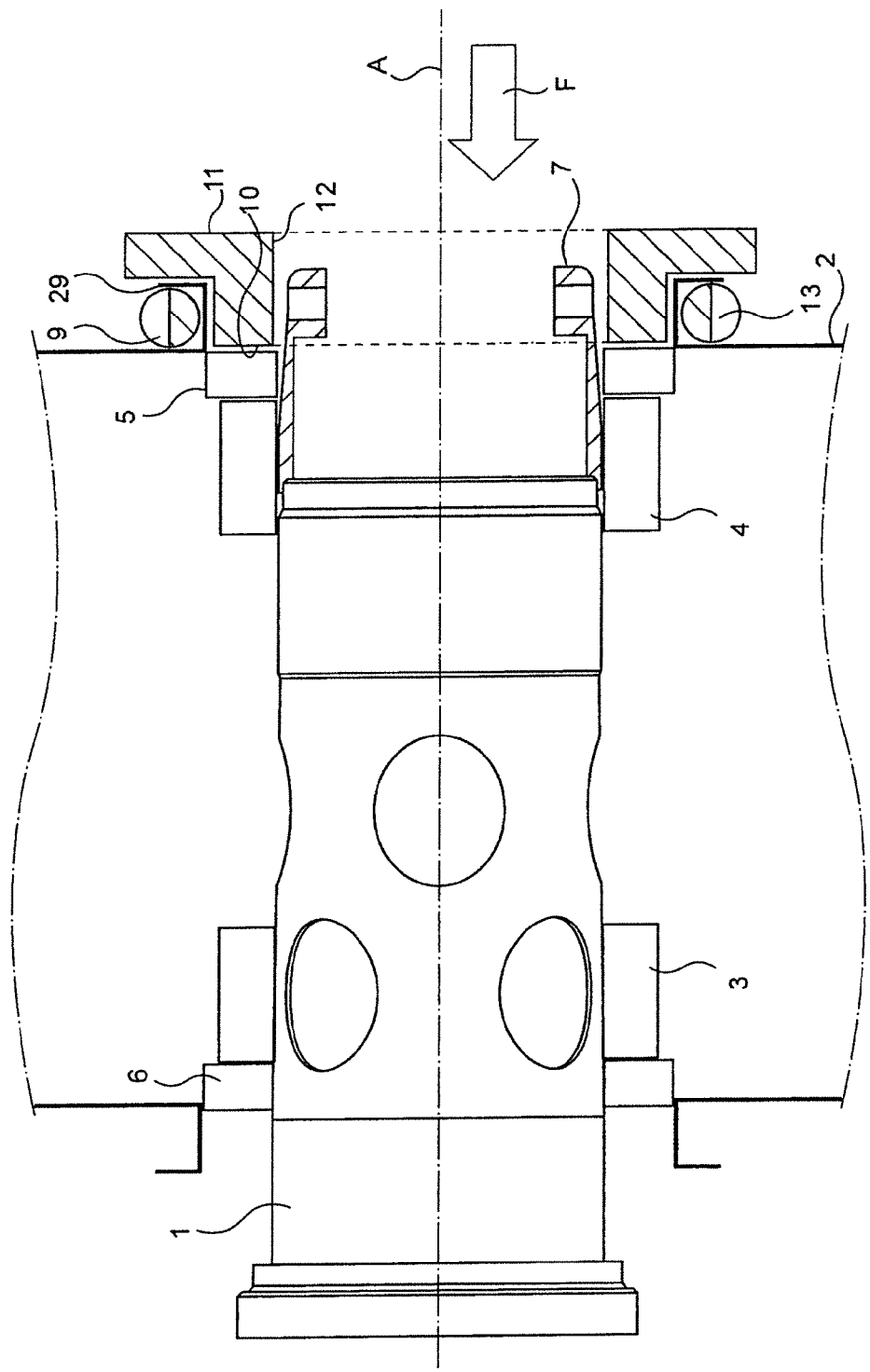
FIG. 1 is a diagrammatic view showing a wheel mounted on the stub axle with the tool of the invention.

FIG. 1 shows a wheel principally comprising around its axis A a rim 2 on which is mounted an outer wheel bearing 4 that surrounds a bore allowing the wheel bearing to be placed on the stub axle 1. The wheel bearing 4 is called "outer" because it is situated on the outside of the undercarriage once the wheel is mounted. Preferably, a wheel bearing seal 5 is provided to protect the wheel bearing 4. It should be noted that a further inner wheel bearing 3 is usually installed with its wheel bearing seal 6, on the inner side when the wheel is mounted on the undercarriage.

At its right-hand end in FIG. 1, the stub axle 1 has a cone 7 for centring the wheel. When the wheel (rim 2) is positioned from right to left according to the arrow F, the outer wheel bearing 4 and the wheel bearing seal 5 experience an effect on the mounting cone 7 tending to eject them outwards, towards the right in FIG. 1.

In order to counter said dynamic effect, the invention makes provision to arrange a tool for holding a wheel bearing seal, and therefore the wheel bearing that the seal protects, before its positioning on the stub axle, comprising a plate 11. The plate 11 has a central bore 12 (axial central opening) intended to allow access to the hub and the cone 7. On the wheel hub side, the rim 2 has a folded flange 20, 29 the profile of which is put to good use by the invention for putting in place at least one locking means, which preferably includes a rod 9.

Alternatively, any projection arranged on the rim and providing the same advantages as the flange 20, 29, can be used for locking the tool onto the rim.

It will be noted that in the example, the folded flange 20, 29 is arranged on the inner periphery of the rim and delimits a central hole of the rim.

Said locking means, which will be described in more detail in the subsequent Figures, in this example principally comprises the rod 9, for example having a cylindrical shape, which has a notch.

In a particular embodiment, a second locking means (including a rod 13) is arranged diametrically opposite the locking means, which includes a rod 9. The two locking means are symmetrically arranged with respect to the wheel axis A (FIGS. 1 and 4a).

Once the tool is in position and locked on the outer flange 20 of the rim 2, it is then possible to position the wheel on the stub axle, without the cone 7 causing the wheel bearing seal to be ejected.

In a particular embodiment, the plate 11 has at least one pressing element 10 such as a pressing collar. The pressing collar surrounds the central hole of the rim, the axis of which is aligned with the wheel axis when the tool is mounted on the rim. The axis of the axial central opening 12 is also aligned with the previous axes. An advantage of the tool for holding a wheel bearing or a wheel bearing seal is that damage to it is avoided during the mounting or removal of the wheel on the stub axle.

It will be noted that the collar extends axially with respect to the plate so as to form a pressing flange which, here, has for example an annular shape.

FIG. 2 shows three successive conditions of a locking means with rod 9 (see FIG. 1) during the introduction of the tool for holding the wheel bearing seal on the flange 20 in the centre of the rim. The locking means is shown without its carrying plate 11 that allows the operative to put it onto the wheel rim 2 during mounting.

In condition (a), a cylindrical rod 9 of the locking means has in its central portion a notch 27 that extends over approximately one half of the cross-section of the cylindrical rod. During positioning of the tool on the central flange 20 of the rim 2, the notch 27 is put into position such that the cylindrical rod 9 of the locking means can pass over the free edge 29 of the outer fold of the rim when the tool is axially displaced towards the rim. Thus, the cylindrical rod 9 of the locking means is arranged in the empty space 23 provided between the main web 26 of the rim 2 and the flange 20 (condition (b)).

In condition (b), the locking means 9 is installed beyond the fold 29 of the rim.

In the condition (c), an actuation knob or element 22, mounted on one end of the cylindrical rod 9, makes it possible to turn the cylindrical rod 9 of the locking means through 180°, when it is turned one half turn according to the arrow 28. In this way, the solid portion of the cylindrical rod 9 situated above the notch 27 in FIG. 4b passes to the level situated below the free edge 29 of the rim. The solid portion is thus found below the notch 27 (notch in active position). As a result, the tool for holding the seal carrying the locking means with rod 9 is then fixed and therefore locked on the central folded edge of the rim (rim flange).

FIG. 3 shows the successive conditions, with (a) corresponding to condition (b) of FIG. 2 and (b) corresponding to condition (c) of FIG. 2 in a front view. As in FIG. 2, the plate 11 of the tool has not been shown in order to allow a clear view of the parts used.

In condition (a), the notch 27 of the cylindrical rod 9 is facing downwards so that it is possible to pass the folded free edge 29 of the rim during the introduction of the tool on the rim.

In condition (b), the knob 22 mounted on the cylindrical rod 9 is turned by one half turn. It is noted that the solid portion of the rod 9 is inside the space provided by the rim fold and in an inverted position with respect to condition (a), effectively locking in position the tool for holding the wheel bearing seal.

The folded free edge of the rim acts as a stop for the rod, preventing any axial withdrawal.

It will be noted that the notch of the rod 9 acts as an engagement element that passes from an idle position to an active locking position in FIGS. 2c and 3c.

FIG. 4a is a front view of a particular embodiment of the tool, seen from inside (inner face of the plate on which the collar 30 is arranged) intended to bear on the wheel bearing back-up seal. The tool principally comprises a generally rectangular plate 33. The plate 33 is for example produced from rigid plastic material.

Passing through centre of the plate is a bore 12 (axial opening) around which is peripherally arranged a pressing element such as a collar 30 that is intended to press on the wheel bearing back-up seal when the tool for holding the seal is mounted on the rim.

The lower and upper edges of the plate 33 respectively have two locking means (one with rod 13 and one with rod 9) diametrically opposite on the plate and with respect to the axis A of rotation of the wheel. The locking means each respectively comprise two blocks 31' and 32' on the one hand, and 31 and 32 on the other hand, as well as a cylindrical rod, already described with reference to FIGS. 1 to 3, that is provided with a notch such as the notch 27 on the rod 9. At one end of the rod 9 (respectively of the rod 13) an actuation element such as a knob 22 (respectively 22') is mounted. The knob 22 (respectively 22'), as has been described in particular with reference to FIGS. 2a-c and 3a-b for the knob 22, makes it possible to turn the notch 27, so as to allow the tool to pass above the central fold of the rim. Then, by turning the knobs 22 and 22' of the two locking means in opposite directions, the operative can lock the two rods 9 and 13 in the rim flange in an ergonomic manner.

FIG. 4b is a side view showing the knob 22 and the block 31 for the upper locking means and the knob 22' and the block 31' for the lower locking means as well as the plate 33 and the pressing collar 30.

Figure 5A:
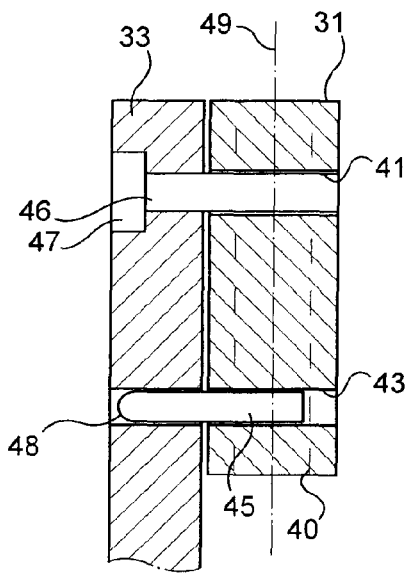
FIGS. 5a and 5b are respectively a side view and a front view of a block used in the tool in FIGS. 4a and 4b.
Figure 5B:
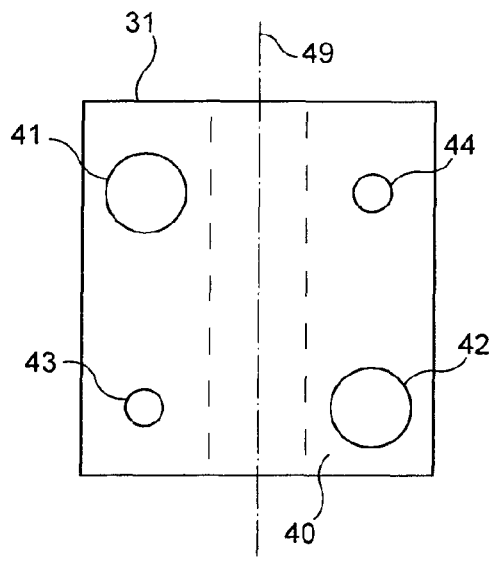

FIG. 5A shows a cross-sectional side view of the mounting of the block 31 on the plate 33 of the tool for holding the wheel bearing seal. FIG. 5B, a top view, shows the block 31 only.

The block 31 has two threaded holes 41 and 42 as well as two plain holes 43 and 44 on either side of a cylindrical through-hole 40 that has an axis 49 intended to receive the cylindrical rod of the locking means. The through-hole 40 is perpendicular to the holes 41-44.

The threaded holes, such as the hole 41 shown in FIG. 5A, correspond with a recess 47 and a threaded hole 46 in the plate 33. A set screw (not shown in FIG. 5A) allows the block 31 to be fixed to the plate 33. For centring the block 31 with the plate 33, pins, such as the pin 45, are arranged in the small holes 43 and 44, which enter the plain holes, such as the corresponding plain hole 48 in the thickness of the plate 33.

Figure 6B:
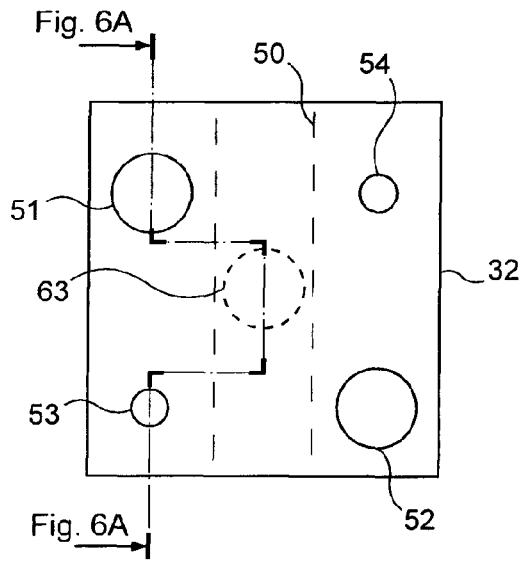
FIGS. 6A and 6B are respectively a section line shown in FIG. 6B and a top view showing the section line of another block used to produce the tool of the invention.
Figure 6A:
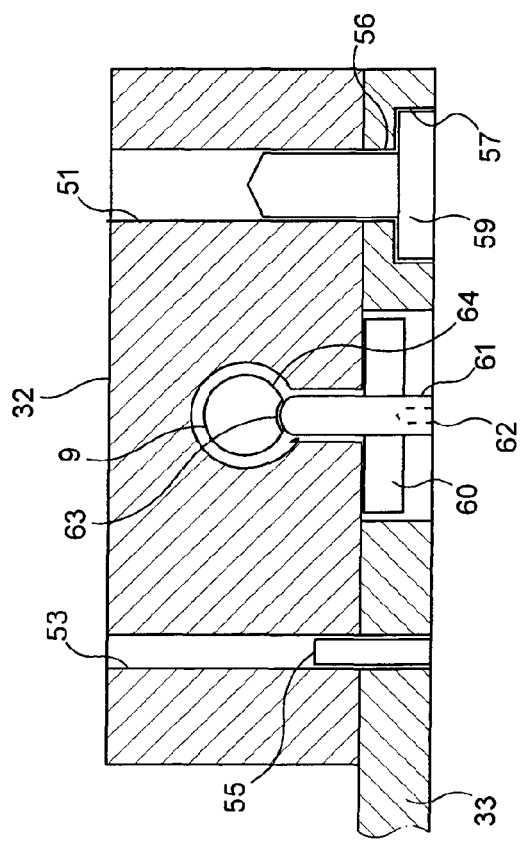

FIG. 6A is a cross-sectional side view of the mounting of the second block 32 of the first locking means (with rod 9) on the plate 33 and FIG. 6B is a top view of the block 32 alone, without the plate 33.

The block 32 is substantially identical to the block 31 and like the latter, comprises two threaded holes 51 and 52 and two plain holes 54 and 53 for receiving a set screw 59 or pins like the pin 55. The block 32 comprises a plain hole 50 (perpendicular to the holes 51-54) intended to receive the end of the rod 9 of the upper locking means.

In addition to the provisions already described for the block 31, the block 32 comprises a ball plunger 61 installed flush in a bore 60 of the block 32 for receiving the end of the cylindrical rod 9 opposite the end carrying the knob 22. The plunger 61 comprises a ball 64 pushed back by a pressing spring (not shown) which when in the locking position enters a notch 63 made in the cylindrical rod 9. Consequently, the locking of the cylindrical rod 9 is maintained under the action of the ball plunger 61.

The ball plunger 61 comprises a hexagon socket 62 for adjusting the pressing force of the ball plunger 61, as well as a mounting screw 60 installed in a hole for this purpose on the lower face of the plate 33.

The method according to the invention enables the operative, after having mounted the holding tool onto the rim, to proceed with the operations of mounting the wheel on the undercarriage without risking any mounting non-conformities. The same advantage arises in respect of the operations of removal and remounting during undercarriage maintenance operations.

The mounting of the tool can be summarized as follows:

Positioning the tool in front of the wheel axis A;

Rotating the two knobs of the locking means in order to place the notches of the rods from an idle position to a position allowing the rods to be passed over the folded rim flange;

Placing the tool in position on the wheel;

Rotating the two knobs of the locking means in order to place the notches of the rods in an active locking position inside the folded rim flange.

The subsequent operations of wheel installation or maintenance can then be carried out.

Removing the tool, which must be carried out at least after installation of the wheel on the undercarriage, comprises the following operations:

Rotating the two knobs of the locking means in order to place the notches of the rods in a position allowing the rods to be passed over the folded rim flange;

Withdrawing the tool from the rim of the mounted wheel.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A tool for holding one of a wheel bearing and a wheel bearing seal of a vehicle wheel comprising a rim having a flange and a wheel bearing with or without a wheel bearing seal, the tool being intended for mounting on the rim of the wheel, the holding tool comprising a plate having at least one pressing element and at least one means of locking the tool on the rim so as to bring said at least one pressing element into contact with one of the wheel bearing and the wheel bearing seal.

2. The tool according to claim 1, the wheel comprising a wheel bearing seal, wherein said at least one pressing element bears on the wheel bearing seal arranged outside the wheel bearing.

3. The tool according to claim 1, wherein the plate has an axial central opening, said at least one pressing element being arranged on the periphery of the axial central opening on one of two opposite faces of the plate intended to be placed facing the rim of the wheel.

4. The tool according to claim 3, wherein said at least one pressing element extends axially away from the face of the plate on which it is arranged.

5. The tool according to claim 3, wherein the pressing collar extends axially with respect to the plate so as to form a pressing flange.

6. The tool according to claim 1, wherein said at least one pressing element is a pressing collar.

7. The tool according to claim 1, wherein said at least one locking means comprises an engagement element that is mobile between an idle position and an active position, wherein a displacement of the engagement element from the idle position to the active position allows said engagement element to be engaged on the rim flange and thus lock the tool on the rim.

8. The tool according to claim 1, wherein said at least one locking means comprises at least one mobile rod that is capable of cooperating with the rim flange in order to lock the tool on the rim.

9. The tool according to claim 1, wherein said at least one locking means comprises at least one cylindrical rod that includes a central portion, wherein the central portion has a notch, and further wherein said at least one cylindrical rod is capable of turning about its axis so as to pass the flange of the rim during the mounting of the tool, then go back down inside the flange to apply said at least one pressing element onto at least one of the wheel bearing and the wheel bearing seal in a locked condition.

10. The tool according to claim 9, wherein the cylindrical rod is carried at each end by two blocks firmly fixed to the tool on the face of the plate opposite to the face on which said at least one pressing element is arranged.

11. The tool according to claim 10, wherein one of the blocks has a ball plunger pressing on an impression in the cylindrical rod pressing on an inside of the flange when the tool is installed on the wheel rim.

12. The tool according to claim 9, wherein the central portion of the rod is inserted into a housing made from a material allowing the rim flange to be protected.

13. The tool according to claim 9, wherein one of the ends of the rod has a knob permitting a half-turn rotation of the rod on the blocks during installation or removal of the tool.

14. The tool according to claim 1, wherein the tool comprises two diametrically opposite locking means.

15. An assembly comprising a tool according to claim 1 and a vehicle wheel comprising a rim having a flange and a wheel bearing with or without wheel bearing seal.

16. A set of aircraft undercarriage wheels comprising an assembly according to claim 15.

17. A method for installation or maintenance of a vehicle wheel, comprising the following steps:
installing a tool for holding one of a wheel bearing and a wheel bearing seal of a vehicle wheel, according to claim 1, on a rim flange of a wheel to be mounted on or removed from the vehicle;
locking at least one means of locking said holding tool onto the rim of the wheel; and
mounting the wheel on a stub axle, respectively or removing the wheel from a stub axle.

18. The method according to claim 17, wherein the vehicle wheel comprises a wheel of an aircraft undercarriage.

19. A set of aircraft undercarriage wheels comprising:
a wheel bearing and/or a wheel bearing seal mounted upon a rim of each of said wheels, wherein said rim includes a flange; and
a tool holding at least one of said wheel bearing and said wheel bearing seal, wherein said tool is mounting on the rim of the wheel,
and wherein said tool comprises:
a plate having at least one pressing element; and
at least one means of locking the tool on the rim so as to bring said at least one pressing element into contact with one of the wheel bearing and the wheel bearing seal.

* * * * *